US011279399B2

(12) United States Patent
Toyoda et al.

(10) Patent No.: US 11,279,399 B2
(45) Date of Patent: Mar. 22, 2022

(54) ELECTRIC POWER STEERING APPARATUS FOR A VEHICLE

(71) Applicant: TOYOTA JIDOSHA KABUSHIKI KAISHA, Toyota (JP)

(72) Inventors: Hiroyuki Toyoda, Mie-ken (JP); Ruriko Sakaguchi, Toyota (JP); Ikuo Kushiro, Mishima (JP); Hironobu Fukuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/815,310

(22) Filed: Mar. 11, 2020

(65) Prior Publication Data
US 2020/0290665 A1 Sep. 17, 2020

(30) Foreign Application Priority Data
Mar. 14, 2019 (JP) .............................. JP2019-047305

(51) Int. Cl.
*B62D 5/04* (2006.01)
*B62D 7/06* (2006.01)
*B62D 3/12* (2006.01)

(52) U.S. Cl.
CPC .............. *B62D 5/0424* (2013.01); *B62D 3/12* (2013.01); *B62D 5/0463* (2013.01); *B62D 7/06* (2013.01)

(58) Field of Classification Search
CPC ...... B62D 5/0424; B62D 3/12; B62D 5/0463; B62D 7/06
See application file for complete search history.

(56) References Cited

U.S. PATENT DOCUMENTS

2002/0063012 A1\* 5/2002 Katou .................... B62D 5/008
180/427
2018/0201304 A1 7/2018 Miyoshi et al.

FOREIGN PATENT DOCUMENTS

| CN | 107848562 A | | 3/2018 | |
| CN | 107921993 A | \* | 4/2018 | ........... B62D 5/0424 |
| DE | 102010063184 A1 | \* | 6/2012 | ............. B62D 3/123 |
| JP | 60-150162 U | | 10/1985 | |

\* cited by examiner

*Primary Examiner* — Jacob D Knutson
(74) *Attorney, Agent, or Firm* — Sughrue Mion, PLLC

(57) ABSTRACT

An electric power steering apparatus includes left and right swing arm members, right and left tie rods pivotally connected at inner ends to arm portions of the swing arm members via a relay rod pivotally connected to the arm portions at both ends, a rack-and-pinion device in which one end of a rack bar is connected to the arm portion of one of the swing arm members, and a steering input transmission system that transmits a steering input to the rack-and-pinion device. An electric steering assist force applying device is connected to the arm portion of the other swing arm member, and applies a force to assist the other swing arm member to swing.

5 Claims, 6 Drawing Sheets

ELECTRIC POWER STEERING APPARATUS FOR A VEHICLE

CROSS-REFERENCE TO RELATED APPLICATION

This application claims priority to Japanese Patent Application No. JP2019-47305 filed on Mar. 14, 2019, the content of which is hereby incorporated by reference in its entirety into this application.

BACKGROUND

1. Technical Field

The present disclosure relates to an electric power steering apparatus for a vehicle such as an automobile.

2. Description of the Related Art

As one of steering apparatuses for vehicles such as automobiles, a steering apparatus has been known that is provided with a steering link mechanism including left and right swing arm members, left and right tie rods connecting left and right wheels and arm portions of the left and right swing arm members, respectively and a relay rod connecting the two arm portions. Steering input provided to a steering input transmission system by a driver is converted by a motion conversion device and transmitted to one of the swing arm members, and the left and right wheels are steered by means of the swing arm member being swung. This type of steering apparatus is suitable for a large vehicle such as a bus.

For example, Japanese Utility Model Application Laid-open Publication No. S60-150162 discloses a power steering apparatus that has the above-described steering link mechanism and a rack-and-pinion device as a motion conversion device that functions as a hydraulic power steering device and extends in a longitudinal direction of a vehicle. According to this type of power steering apparatus, it is possible to assist a driver's steering operation and to reduce a power transmission loss as compared to where a motion conversion device is a recirculating ball screw device.

However, the rack-and-pinion device includes a reciprocating rack bar, and the rack bar is supported by rack bushes at both ends of a housing, so that it must be long as described later in detail. Therefore, the conventional power steering apparatus described in the above publication has poor mountability to a vehicle and poor degree of freedom in vehicle design as compared to where a motion conversion device is, for example, a recirculating ball screw device.

Further, in a vehicle in which driving assistance for automatically steering steered wheels is performed, steering of the steered wheels needs to be performed with good responsiveness, so that a rack-and-pinion device needs to have an electric power steering function. When the rack-and-pinion device is a rack-assist type rack-and-pinion device, it must be longer because of the provision of an electric steering assist force applying device.

SUMMARY

The present disclosure provides an electric power steering apparatus which has the steering link mechanism described above and is improved to enhance the mountability on a vehicle and the degree of freedom in vehicle design as compared with such a conventional power steering apparatus as described in the above publication.

According to the present disclosure, an electric power steering apparatus for a vehicle is provided which comprises left and right swing arm members each having an arm portion that swings about an axis extending in the vertical direction, a relay rod pivotally connected to the arm portions of the left and right swing arm members at both ends, left and one of right tie rods respectively pivotally connected to left and right steered wheels, respectively, at outer ends and the relay rods and the arm portions of the left and right swing arm members at inner ends, a rack-and-pinion device in which one end of a rack bar is connected to the arm portion of one of the swing arm members so as to swing the one of the swing arm members about the corresponding axis, and a steering input transmission system that transmits a steering input to a pinion shaft of the rack-and-pinion device.

An electric steering assist force applying device is connected to the arm portion of the other swing arm member, and the electric steering assist force applying device is configured to apply to the other swing arm member a force that assists the other swing arm member to swing about the corresponding axis.

According to the above configuration, one end of the rack bar is connected to the arm portion of the one of the swing arm members so as to swing the one of the swing arm members about the corresponding axis, and an electric steering assist force applying device is connected to the arm portion of the other of the swing arm members. The electric steering assist force applying device applies to the other swing arm member a force that assists the other swing arm member to swing about the corresponding axis.

Thus, the rack-and-pinion device does not need to be provided with the electric steering assist force applying device, so that the rack-and-pinion device can be smaller than the rack-and-pinion device provided with an electric steering assist force applying device and the degree of freedom of arrangement can be improved. Therefore, the mountability to the vehicle and the degree of freedom in the design of the vehicle can be improved as compared with the conventional power steering apparatus in which an electric steering assist force applying device is provided in the rack-and-pinion device.

In one aspect of the present disclosure, the electric steering assist force applying device includes an electric motor, a conversion device that converts torque of the electric motor into a reciprocating motion force, a transmission link that transmits the force converted by the conversion device to the arm portion of the other swing arm member, and a control unit for controlling the electric motor, and the control unit is configured to control the torque of the electric motor based on steering torque generated in the steering input transmission system.

According to the above aspect, the torque of the electric motor is converted into a reciprocating motion force by the conversion device, and the converted force is transmitted via the transmission link to the arm portion of the other swing arm member, and further transmitted to the one of the swing arm members via the relay rod. Thus, a force for assisting steering can be applied to the steering input transmission system. Further, since the torque of the electric motor is controlled by the electronic control unit based on steering torque generated in the steering input transmission system, a force for assisting steering can be controlled based on the steering torque.

In another aspect of the present disclosure, the left and right swing arm members each have first and second arm portions extending in directions different from each other with respect to the axis; the left and right tie rods are pivotally connected at their inner ends to the first arm portions of the left and right swing arm members, respectively; one end of the rack bar is pivotally connected to the second arm portion of the one of the swing arm members; the electric steering assist force applying device is connected to the second arm portion of the other swing arm member; and the relay rod is pivotally connected at both ends to one of the first and second arms of the left and right swing arm members.

According to the above aspect, the left and right swing arm members have the first arm portions and second arm portions extending in directions different from each other with respect to the axes. The left and right tie rods are pivotally connected at inner ends to the first arm portions of the left and right swing arm members, respectively. One end of the rack bar is pivotally connected to the second arm portion of one of the swing arm members, the electric steering assist force applying device is connected to the second arm portion of the other swing arm member, and the relay rod is pivotally connected at both ends to one of the first and second arms of the left and right swing arm members.

Therefore, the degree of freedom of pivotal attachment of the rack bar, the electric steering assist force applying device and the relay rod can be increased as compared to where the left and right swing arm members each have only one arm portion. This also improves mountability of the electric power steering apparatus on a vehicle and the degree of freedom in designing a vehicle. In particular, an extension direction of the rack-and-pinion device and the electric steering assist force applying device can be freely set by setting the extension direction of the second arm portions with respect to the first arm portions.

In another aspect of the present disclosure, the rack-and-pinion device includes a pinion that is integral with the pinion shaft and meshes with rack teeth of the rack bar, a housing that accommodates an area of the rack bar where the rack teeth are provided, and a pair of pressing devices disposed on both sides of the pinion along a longitudinal direction of the rack bar and pressing the rack bar against the pinion.

According to the above aspect, the rack-and-pinion device includes a pair of pressing devices disposed on both sides of the pinion along a longitudinal direction of the rack bar and pressing the rack bar against the pinion. Thus, the rack bar can be supported by the pinion and the pair of pressing devices so as to be able to reciprocate along the longitudinal direction, so that the rack bar does not have to be supported by two rack bushes (for example, annular resin members) at portions outside the region where the rack teeth are provided. Therefore, the rack-and-pinion device can be made smaller and the degree of freedom of arrangement can be improved as compared with a structure in which outer portions on both sides of the region provided with the rack teeth are supported by two rack bushes, so that the mountability to a vehicle and the degree of freedom in designing a vehicle can be improved as compared with a conventional steering apparatus.

In another aspect of the present disclosure, the rack bar is supported reciprocably in the longitudinal direction by the pinion and the pair of pressing devices, and no bush device is provided between the rack bar and the housing.

According to the above aspect, the rack bar can be supported reciprocably in the longitudinal direction by the pinion and the pair of pressing devices, and hence, there is no need to provide any bush device between the rack bar and the housing. Therefore, the length of the rack bar and the housing can be reduced, and the size of the rack-and-pinion device can be reduced.

In another aspect of the present disclosure, the rack bar extends out from the housing on the side of one end and does not extend out from the housing on the side of the other end.

According to the above aspect, the rack bar extends out from the housing at one end, but does not extend out from the housing at the other end, so that the housing may be dosed at the other end. Therefore, since a member for sealing between the rack bar and the housing is unnecessary on the other end side, the number of parts of the rack-and-pinion device can be reduced and the structure thereof can be simplified as compared to where the rack bar extends out from the housing also on the other end side.

Further, in another aspect of the present disclosure, the pair of pressing devices are configured to press the rack bar against the pinion along center lines extending perpendicularly to the longitudinal direction of the rack bar on a side opposite to the pinion with respect to the rack bar.

According to the above aspect, the rack bar is pressed by the pair of pressing devices against the pinion along the center lines extending perpendicularly to the longitudinal direction of the rack bar on the side opposite to the pinion with respect to the rack bar. Therefore, the rack bar can be satisfactorily pressed against the pinion to maintain their good meshing state, and the rack bar can be supported by the pinion and the pair of pressing devices so as to stably reciprocate in the longitudinal direction.

Further, in another aspect of the present disclosure, the center lines of the pair of pressing devices are equidistantly spaced apart from a meshing portion between the rack teeth of the rack bar and the pinion.

According to the above aspect, the pair of pressing devices press the rack bar against the pinion at positions equidistantly spaced apart from the meshing portion between the rack teeth of the rack bar and the pinion. Therefore, as compared to where the center lines of the pair of pressing devices are spaced apart from each other by different distances from the meshing portion between the rack teeth of the rack bar and the pinion, it is possible to reduce a possibility that a moment around the meshing portion acts on the rack bar due to the pressing by the pair of pressing devices.

Other objects, other features and attendant advantages of the present disclosure will be readily understood from the description of the embodiments of the present disclosure described with reference to the following drawings.

DETAILED DESCRIPTION

The present disclosure will now be described with respect to an embodiment in detail with reference to the accompanying drawings.

Embodiment

Figure 1:
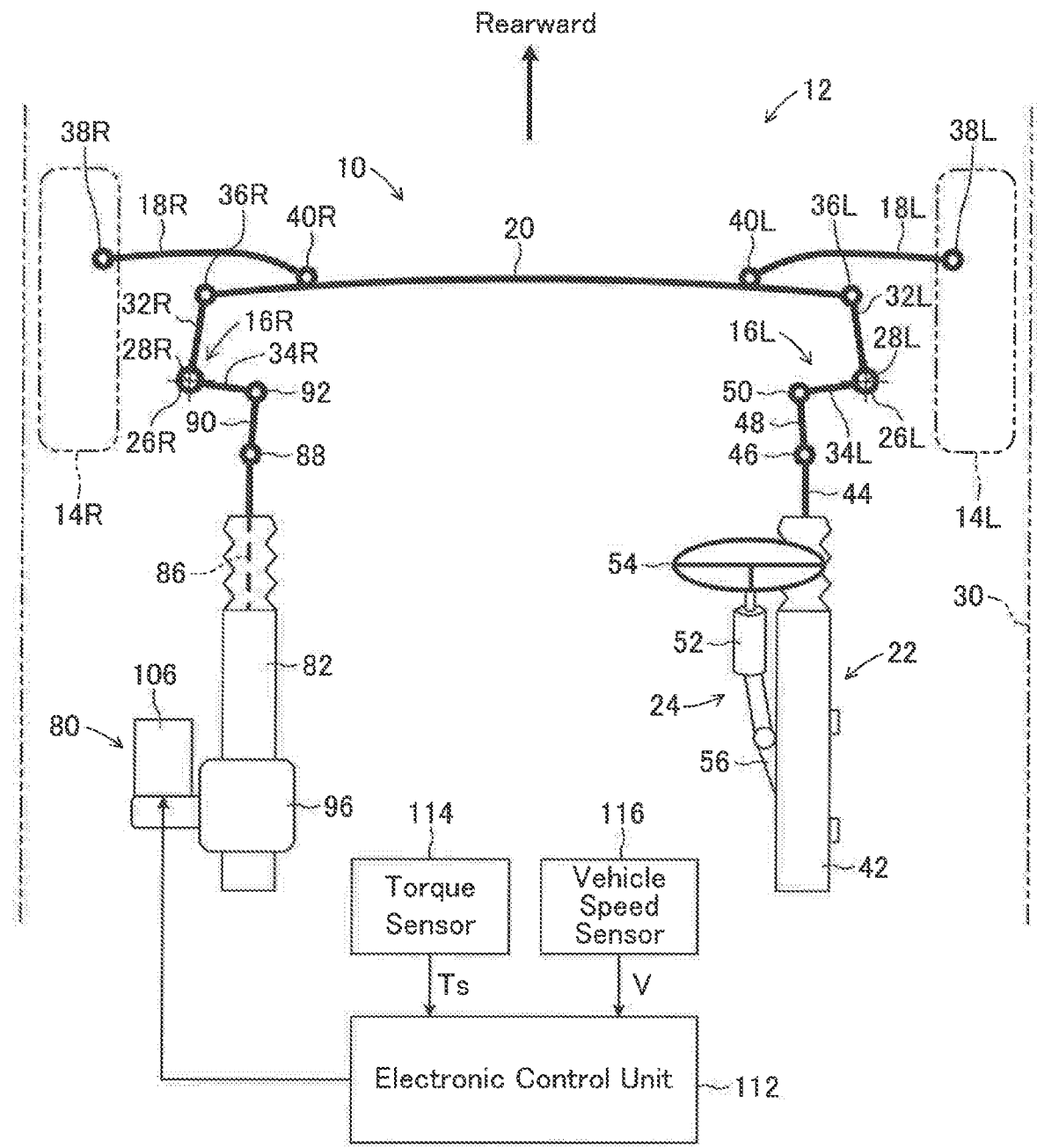
FIG. 1 is an schematic plan view showing an embodiment of an electric power steering apparatus according to the present disclosure applied to a right-hand traffic vehicle in a straight traveling state of the vehicle.

In FIG. 1, reference numeral 10 indicates an electric power steering apparatus according to the embodiment of the present disclosure. The electric power steering apparatus 10 is applied to a so-called left-hand drive vehicle 12, that is, a right-hand traffic vehicle, and is configured to steer left and right front wheels 14L and 14R that are steered wheels of the vehicle 12. The steering device 10 includes left and right swing arm members 16L and 16R, left and right tie rods 18L and 18R, a relay rod 20, a rack-and-pinion device 22, and a steering input transmission system 24.

The swing arm members 16L and 16R are disposed at positions spaced apart in the lateral direction of the vehicle 12, and are supported by a vehicle body 30 of the vehicle 12 so as to be able to swing about vertical axes 28L and 28R at boss portions 26L and 26R, respectively. In the illustrated embodiment, the swing arm members 16L and 16R have first arm portions 32L and 32R and second arm portions 34L and 34R, respectively. The first arm portions 32L and 32R respectively extend from the boss portions 26L and 26R substantially to the rear of the vehicle 12 when the vehicle is in a straight traveling state, and the second arm portions 34L and 34R respectively extend from the boss portions 26L and 26R in the inboard direction of the vehicle across the longitudinal direction of the vehicle.

The relay rod 20 extends in the lateral direction of the vehicle 12, and is pivotally connected at both ends to the first arm portions 32L, 32R of the left and right swing arm members 16L, 16R by joints 36L, 36R, respectively. The left and right tie rods 18L, 18R are pivotally connected at their outer ends to knuckle arms (not shown) of the left and right front wheels 14L, 14R by joints 38L, 38R, respectively, and are pivotally connected at their inner ends to neighbors of the corresponding ends of the relay rod 20 by joints 40L, 40R, respectively. Therefore, in the illustrated embodiment, the inner ends of the left and right tie rods 18L, 18R are pivotally connected to the first arm portions 32L, 32R of the left and right swing arm members 16L, 16R, respectively via the relay rod 20. Notably, the inner ends of the left and right tie rods 18L, 18R may be pivotally connected directed to the first arm portions 32L, 32R, respectively.

Figure 2:
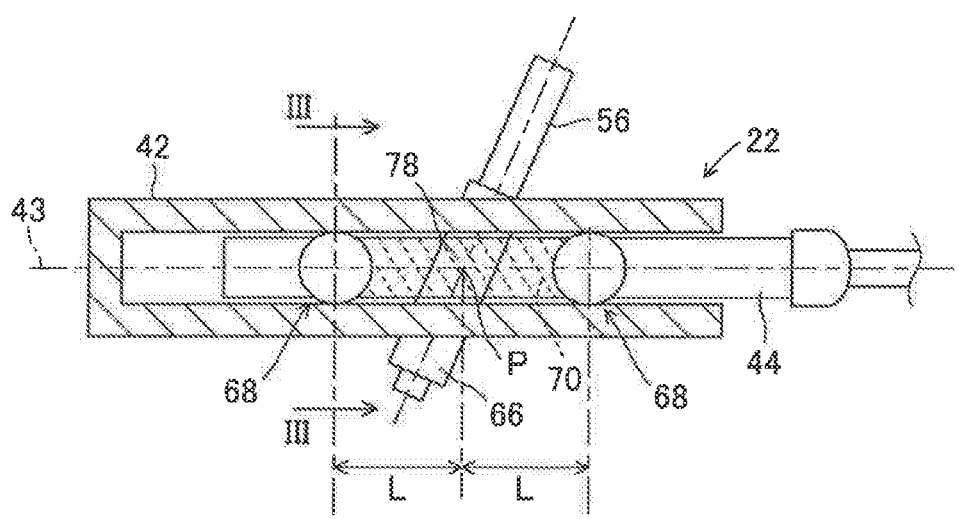
FIG. 2 is an enlarged sectional view showing a rack-and-pinion device in the embodiment shown in FIG. 1.

The rack-and-pinion device 22 is disposed on the left side of the vehicle 12 and extends substantially in the longitudinal direction of the vehicle 12. As shown in FIG. 2, the rack-and-pinion device 22 includes a housing 42 and a rack bar 44 extending along an axis 43, and the rack bar 44 extends out from the housing 42 toward the rear of the vehicle on the side of the rear end. The housing 42 is closed at the front end, and the rack bar 44 does not extend out toward the front of the vehicle from the housing 42 on the side of the front end.

One end of a connection link 48 is pivotally connected to the rear end of the rack bar 44 by a joint 46, and the other end of the connection link 43 is pivotally connected to the second arm 34L of the left swing arm member 16L by a joint 50. Accordingly, the rear end of the rack bar 44 is connected to the second arm portion 34L of the left swing arm member 16L via the connection link 48 so as to swing the swing arm member 16L about the corresponding axis 28L. Therefore, a reciprocating motion of the rack bar 44 is converted into a swing motion about the axis 28L by the connection link 48 and transmitted to the swing arm member 16L. Conversely, the swing motion of the swing arm member 16L about the axis 28L is converted into a reciprocating motion by the connection link 48 and transmitted to the rack bar 44.

Although joints such as the joint 36L are not shown in detail in FIG. 1, any joint known in the art can be used as long as corresponding two members can be relatively pivotally connected. For example, a ball joint, a pillow ball, a combination of a pivot and a bush may be used.

Although not shown in detail in FIG. 1, the steering input transmission system 24 includes a known steering shaft 52 including an upper steering shaft, a lower steering shaft, universal joints, and the like. A steering wheel 54 operated by a driver is connected to an upper end of the steering shaft 52, and a lower end of the steering shaft 52 is connected to a pinion shaft 56 of the rack-and-pinion device 22. Thus, the steering input transmission system 24 transmits a steering input given to the steering wheel 54 by the driver to the pinion shaft 56.

As shown in FIG. 2, the rack-and-pinion device 22 further includes a pinion 66 and a pair of pressing devices 68. The pinion 66 is formed integrally with the pinion shaft 56 via a torsion bar and meshes with rack teeth 70 of the rack bar 44. The housing 42 accommodates a main portion of the rack bar 44 including an area where the rack teeth 70 are provided. The pair of pressing devices 68 are arranged on both sides of the pinion 66 along the longitudinal direction of the rack bar 44, and press the rack bar 44 against the pinion 66.

Figure 3:
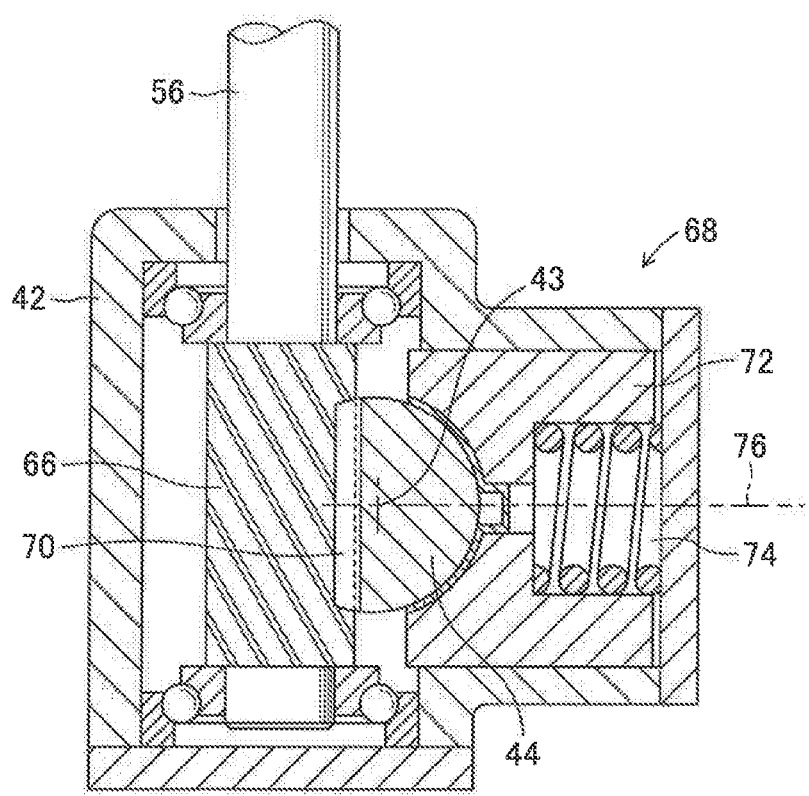
FIG. 3 is an enlarged sectional view showing one pressing device by cutting the rack-and-pinion device along line III-III in FIG. 2.

As shown in FIG. 3, each pressing device 68 includes a rack guide 72 and a compression coil spring 74 arranged on the side opposite to the pinion 66 with respect to the rack bar 44. Each rack guide 72 is supported by the housing 42 so as to reciprocate along a center line 76 extending perpendicular to the axis 43 of the rack bar 44. Each compression coil spring 74 presses the rack guide 72 against the rack bar 44 along the center line 76. Thus, the rack bar 44 is supported by the pinion 66 and the pair of pressing devices 68 so as to be able to reciprocate in the longitudinal direction, and no rack bush or the like is provided between the rack bar 44 and the housing 42.

In particular, in the illustrated embodiment, as shown in FIG. 2, the center lines 76 of the pair of pressing devices 68 are spaced apart from a center P of a meshing portion 78 between the rack teeth 70 of the rack bar 44 and the pinion 66 by equal distances L along the axis 43. Notably, the distances L between the center lines 76 of the pair of pressing devices 68 and the center P may be different from each other.

Figure 4:
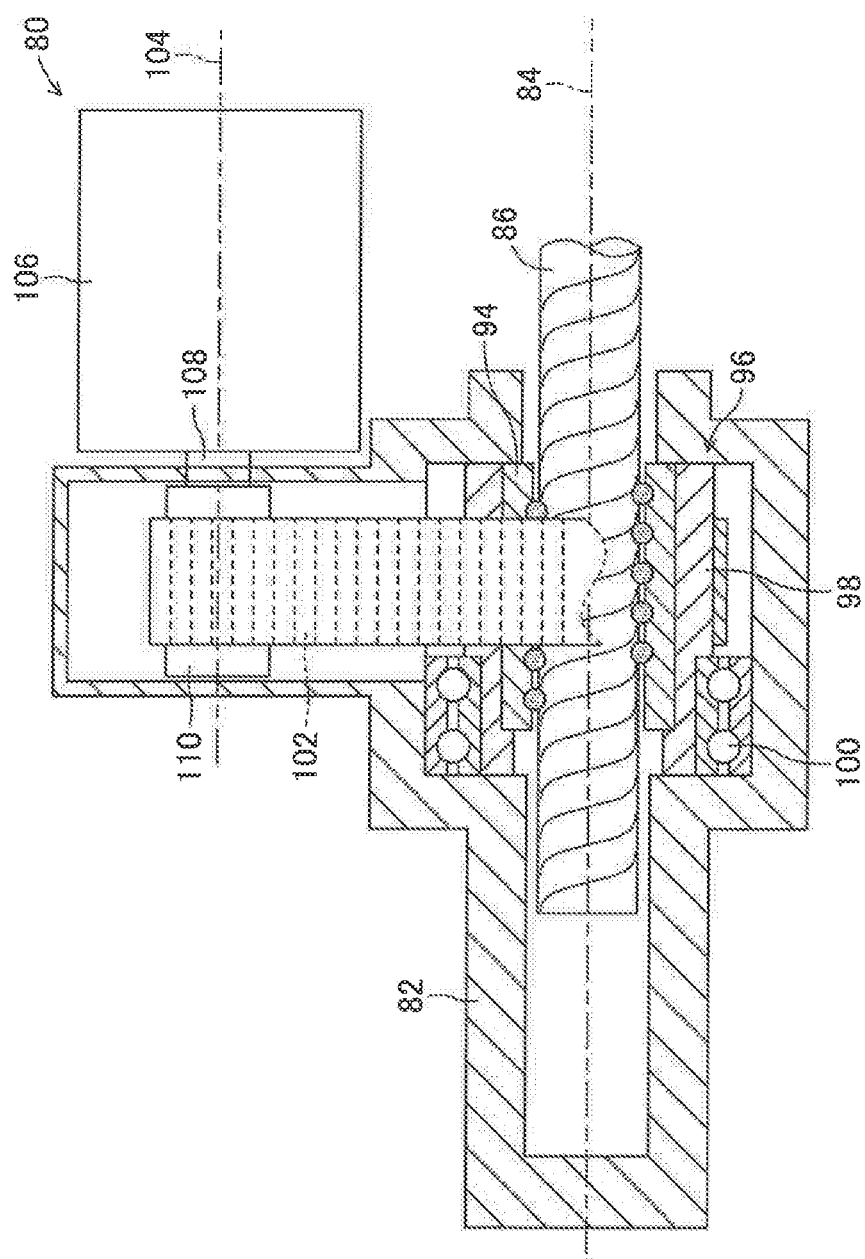
FIG. 4 is an enlarged cross-sectional view showing an electric steering assist force applying device in the embodiment shown in FIG. 1.

As shown in FIG. 1, an electric steering assist force applying device 80 is disposed on the right side of the vehicle 12, and the steering assist force applying device 80 extends substantially in the longitudinal direction of the vehicle 12. As shown in FIG. 4, the steering assist force applying device 80 includes a housing 82 and a screw shaft 86 extending along an axis 84, and the screw shaft 86 extends from the housing 82 toward the rear of the vehicle on the rear end side. The housing 82 is closed at the front end, and the screw shaft 86 does not extend out toward the front of the vehicle from the housing 82 on the front end side.

As shown in FIG. 1, one end of a transmission link 90 is pivotally connected to the rear end of the screw shaft 86 by a joint 88, and the other end of the transmission link 90 is pivotally connected to the second arm portion 34R of the right swing arm member 16R by a joint 92. Thus, a reciprocating motion of the screw shaft 86 is converted into a swing motion about the axis 28R by the transmission link 90 and transmitted to the swing arm member 16R. Conversely, the swing motion of the swing arm member 16R about the axis 28R is converted into a reciprocating motion by the transmission link 90 and transmitted to the screw shaft 86.

As shown in FIG. 4, a nut 94 is arranged in the housing 82, and the nut 94 is fitted on the screw shaft 86. The screw shaft 86 and the nut 94 cooperate with a plurality of balls interposed therebetween to form a ball screw device 96. A pulley member 98 is integrally fitted to the nut 94, and the nut 94 and the pulley member 98 are supported rotatably about the axis 84 by a radial bearing 100.

A spur gear or a helical gear is formed on the outer peripheral surface of the pulley member 98, and a toothed belt 102 is wound around the gear of the pulley member 98. A pulley member 110 is integrally attached to an output shaft 108 of an electric motor 106 that rotates about an axis 104 parallel to the axis 84, and the toothed belt 102 is also wound around a gear of the pulley member 110. An effective diameter of the gear of the pulley member 110 is smaller than an effective diameter of the gear of the pulley member 98, so that output torque of the electric motor 106 is increased and transmitted to the pulley member 98 and the nut 94.

The torque transmitted to the nut 94 is converted into an axial force of the screw shaft 86 by the ball screw device 96, and further converted into a swing motion about the axis 28R by the transmission link 90, and is then transmitted to the swing arm member 16R as steering assist torque. The steering assist force applying device 80 includes the transmission link 90, the ball screw device 96, the pulley members 98 and 110, the toothed belt 102, and the electric motor 106.

The steering assist force applying device 80 further includes an electronic control unit 112. The steering input transmission system 24 is provided with a torque sensor 114 for detecting steering torque Ts generated in the steering input transmission system. The electronic control unit 112 controls the steering assist torque by controlling output torque of the electric motor 106 based on steering torque Ts detected by the torque sensor 114 and a vehicle speed V detected by a vehicle speed sensor 116.

As can be understood from the above description, according to the embodiment, the rear end of the rack bar 44 is connected to the second arm portion 34L of the left swing arm member 16L so as to swing the left swing arm member about the corresponding axis 28L. The electric steering assist force applying device 80 is connected to the second arm portion 34R of the right swing arm member 16R, and the electric steering assist force applying device 80 applies assist torque to the right swing arm member 16R to assist the right swing arm member to swing around the axis 28R. The assist torque is transmitted to the first arm portion 32L of the left swing arm member 16L by the relay rod 20, and further transmitted to the rack-and-pinion device 22 via the connection link 48.

Thus, the rack-and-pinion device 22 does not need to be provided with an electric steering assist force applying device, so that the rack-and-pinion device can be smaller than a rack-and-pinion device provided with an electric steering assist force applying device and the degree of freedom of arrangement can be improved. Therefore, the mountability to the vehicle and the degree of freedom in the design of the vehicle can be improved as compared with a conventional power steering apparatus in which an electric steering assist force applying device is provided in a rack-and-pinion device.

Figure 5:
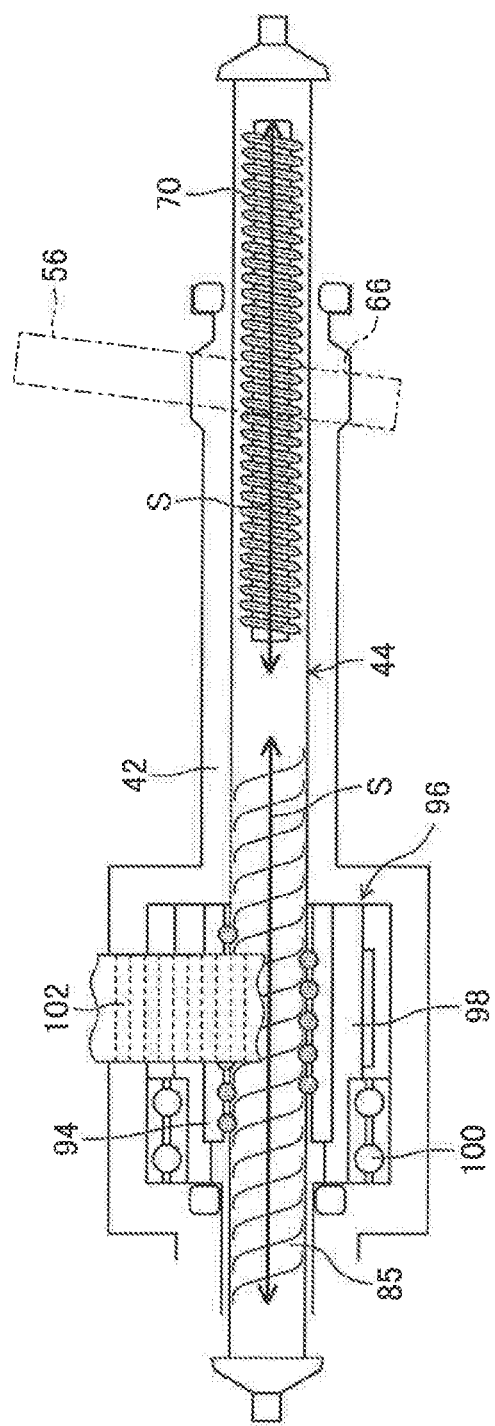
FIG. 5 is an illustrative sectional view showing a conventional rack-assist type rack-and-pinion device.

FIG. 5 is an illustrative sectional view showing a conventional rack-assist type rack-and-pinion device. In FIG. 5, a double-headed arrow S indicates a rack stroke, and members corresponding to those shown in FIG. 1 and the like are denoted by the same reference numerals as those in FIG. 1. This is the same for FIG. 6 described later.

As shown in FIG. 5, at least an area 85 of a thread groove having a length corresponding to the rack stroke S and an area of the rack teeth 70 must be provided in the rack bar 44. For this reason, the rack bar 44 and the housing 42 must be longer, so that the size and weight of the rack-and-pinion device cannot be reduced.

Figure 6:
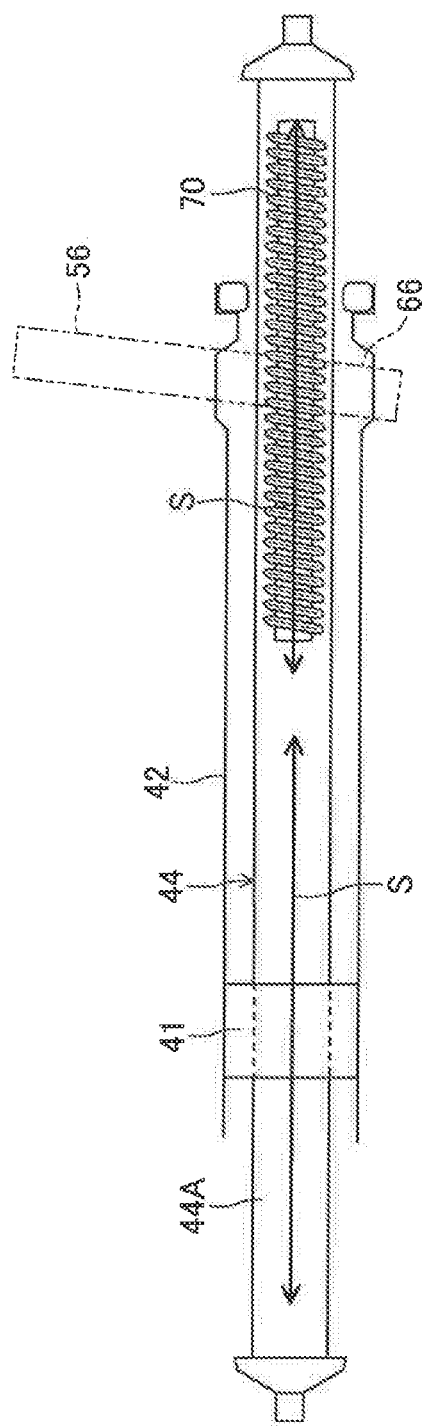
FIG. 6 is an illustrative sectional view showing a rack-and-pinion device in which a rack bar is supported by one end bush and extends through a housing.

FIG. 6 is an illustrative sectional view showing a rack-and-pinion device in which a rack bar is supported by one rack bush. In this structure, a supported area 44A having a length corresponding to at least the rack stroke S must be provided in the rack bar 44, and, accordingly, the rack bar 44 and the housing 42 must be longer, so that the size and weight of the rack-and-pinion device cannot be reduced.

Further, according to the embodiment, the torque of the electric motor 106 is converted into a reciprocating motion force by the ball screw device 96 as a conversion device, and the converted force is transmitted via the transmission link 90 to the second arm portion 34R of the right swing arm member 16R, and further transmitted to the left swing arm member 16L via the relay rod 20. Thus, a force for assisting steering can be applied to the steering input transmission system 24. Further, since the torque of the electric motor 106 is controlled by the electronic control unit 112 based on steering torque Ts generated in the steering input transmission system 24, a force for assisting steering can be controlled based on the steering torque.

The left and right swing arm members 16L, 16R have the first arm portions 32L, 32R and second arm portions 34L, 34R extending in directions different from each other with respect to the axes 28L, 28R, respectively. The left and right tie rods 18L, 18R are pivotally connected at inner ends to the first arm portions 32L, 32R of the left and right swing arm members 16L, 16R, respectively, via the relay rod 20. The rear end of the rack bar 44 is pivotally connected to the second arm portion 34L of the left swing arm member 32L, and the relay rod 20 is pivotally connected at both ends to the first arm portions 32L, 32R of the left and right swing arm members.

Therefore, the degree of freedom of pivotal attachment of the rack bar 44 and the relay rod 20 can be increased as compared to where each of the left and right swing arm members 16L and 16R has only one arm portion. This also improves mountability of the electric power steering apparatus on a vehicle and the degree of freedom in designing the vehicle. In particular, the extension direction of the rack-and-pinion device 22 can be freely set by setting the extension direction of the second arm portions 34L, 34R with respect to the first arm portions 32L, 32R, respectively.

The rack bar 44 extends out from the housing 42 on the rear end side, but does not extend out from the housing on the front end side, and the housing is closed on the front end side. Therefore, a member for sealing between the rack bar 44 and the housing 42 on the front end side is unnecessary, so that the number of parts of the rack and pinion device 22 can be reduced and the structure can be simplified as compared to where the rack bar also extends out from the housing on the front end side.

The rack bar 44 is pressed against the pinion by the pair of pressing devices 68 on both sides of the pinion 66 along the center lines 76 extending perpendicular to the longitudinal direction of the rack bar. Therefore, the rack bar can be satisfactorily pressed against the pinion to maintain their good meshing state, and the rack bar can be stably reciprocated in the longitudinal direction by the pinion and the pair of pressing devices.

Further, the pair of pressing devices 68 presses the rack bar against the pinion at the positions spaced apart by an equal distance L from the meshing portion 78 between the rack teeth 70 of the rack bar 44 and the pinion 66. Therefore, as compared to where the center lines of the pair of pressing devices are spaced apart by different distances from the meshing portion between the rack teeth of the rack bar and the pinion, it is possible to reduce the possibility that a moment around the meshing portion acts on the rack bar 44 due to the pressing by the pair of pressing devices.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, the swing arm members 16L and 16R have the first arm portions 32L and 32R and the second arm portions 34L and 34R, respectively, but each may have one arm portion. Further, when the vehicle 12 is in the straight traveling state, the first arm portions 32L and 32R extend substantially rearward from the boss portions 26L and 26R, respectively, and the second arm portions 34L and 34R extend from the bosses 26L, 26R, respectively, in the vehicle inboard direction across the longitudinal direction of the vehicle. However, the first arm portions 32L, 32R may extend substantially forward of the vehicle, and the second arm portions 34L, 34R may extend in a direction different from the illustrated direction including the outboard direction of the vehicle. Thus, the rack-and-pinion device 22 may extend in a direction other than the longitudinal direction of the vehicle.

In the above-described embodiment, the inner ends of the left and right tie rods 18L, 18R are pivotally connected to the relay rod 20 near corresponding ends, but may be pivotally connected to the first arm portions 32L, 32R of the swing arm members 16L, 16R, respectively. In that case, the relay rod 20 may be pivotally connected to the second arm portions 34L, 34R of the swing arm members 16L, 16R, respectively.

In the above-described embodiment, the electric power steering apparatus 10 is applied to a so-called left-hand drive vehicle, that is, a right-hand traffic vehicle 12, but may be applied to a so-called right-hand drive vehicle, that is, a left-hand traffic vehicle. In that case, the rack-and-pinion device 22 is disposed on the right side of the vehicle.

In the above-described embodiment, the electric power steering apparatus 10 is configured to steer the left and right front wheels 14L and 14R which are the steered wheels of the vehicle 12, but may be configured to steer the left and right rear wheels.

Further, in the above-described embodiment, the conversion device that converts the torque of the electric motor 106 into a force of the reciprocating motion in the electric steering assist force applying device 80 is the ball screw device 96, but the conversion device may be any conversion device known in the art. For example, a rack-and-pinion device similar to the rack-and-pinion device 22 may be employed as the conversion device.

What is claimed is:

1. An electric power steering apparatus for a vehicle that comprises left and right swing arm members each having an arm portion that swings about an axis extending in a vertical direction, a relay rod pivotally connected to the arm portions of the left and right swing arm members at both ends, left and one of right tie rods respectively pivotally connected to left and right steered wheels, respectively, at outer ends and the relay rod and the arm portions of the left and right swing arm members at inner ends, a rack-and-pinion device in which one end of a rack bar is connected to the arm portion of one of the swing arm members so as to swing the one of the swing arm members about the corresponding axis, and a steering input transmission system that transmits a steering input to a pinion shaft of the rack-and-pinion device, wherein an electric steering assist force applying device is connected to the arm portion of the other swing arm member, and the electric steering assist force applying device is configured to apply to the other swing arm member a force that assists the other swing arm member to swing about the corresponding axis, wherein the rack-and-pinion device includes a pinion that is integral with the pinion shaft and meshes with rack teeth of the rack bar, a housing that accommodates an area of the rack bar where the rack teeth are provided, and a pair of pressing devices disposed on both sides of the pinion along a longitudinal direction of the rack bar and pressing the rack bar against the pinion, wherein the pair of pressing devices are configured to press the rack bar against the pinion along center lines extending perpendicularly to the longitudinal direction of the rack bar on a side opposite to the pinion with respect to the rack bar, and wherein the center lines of the pair of pressing devices are equidistantly spaced apart from a meshing portion between the rack teeth of the rack bar and the pinion.

2. The electric power steering apparatus for a vehicle according to claim 1, wherein the electric steering assist force applying device includes an electric motor, a conversion device that converts torque of the electric motor into a reciprocating motion force, a transmission link that transmits the force converted by the conversion device to the arm portion of the other swing arm member, and a control unit for controlling the electric motor, and the control unit is configured to control the torque of the electric motor based on steering torque generated in the steering input transmission system.

3. The electric power steering apparatus for a vehicle according to claim 1, wherein the arm portion of each of the left and right swing arm members comprise first and second arm portions extending in directions different from each other with respect to the axis; the left and right tie rods are pivotally connected at their inner ends to the first arm portions of the left and right swing arm members, respectively; one end of the rack bar is pivotally connected to the second arm portion of the one of the swing arm members; the electric steering assist force applying device is connected to the second arm portion of the other swing arm member; and the relay rod is pivotally connected at both ends to one of the first and second arms of the left and right swing arm members.

4. The electric power steering apparatus for a vehicle according to claim 1, wherein the rack bar is supported reciprocably in the longitudinal direction by the pinion and the pair of pressing devices, and no bush device is provided between the rack bar and the housing.

5. The electric power steering apparatus for a vehicle according to claim 1, wherein the rack bar extends out from the housing on the side of one end and does not extend out from the housing on the side of the other end.

* * * * *